United States Patent [19]

Lee

[11] Patent Number: 5,681,672
[45] Date of Patent: Oct. 28, 1997

[54] ALKALI-ZINC SECONDARY BATTERY

[75] Inventor: Doo-yeon Lee, Kyungki-do, Rep. of Korea

[73] Assignee: Samsung Electronics Co., Ltd., Kyungki-do, Rep. of Korea

[21] Appl. No.: 587,794

[22] Filed: Dec. 26, 1995

[51] Int. Cl.$^6$ ...................................................... H01M 4/42
[52] U.S. Cl. ........................ 429/229; 429/231; 429/223; 429/194; 429/199
[58] Field of Search ........................ 429/199, 194, 429/229, 231, 223

[56] References Cited

U.S. PATENT DOCUMENTS

| | | | |
|---|---|---|---|
| 4,304,828 | 12/1981 | Vaidyanathan | 429/229 |
| 4,968,569 | 11/1990 | Chiba et al. | 429/229 |
| 5,215,836 | 6/1993 | Eisenberg | 429/203 |
| 5,302,475 | 4/1994 | Adler et al. | 429/229 |
| 5,563,008 | 10/1996 | Pyun et al. | 429/229 |

OTHER PUBLICATIONS

English Abstract of Japanese Patent Laid–Open Publication No. Sho. 60–185372, published Sep. 20, 1985.
English Abstract of Japanese Patent Laid–Open Publication No. Sho. 62–108467, published May 19, 1987.
English Abstract of Japanese Patent Laid–Open Publication No. Sho. 60–208053, published Oct. 19, 1985.
English Abstract of Japanese Patent Laid–Open Publication No. Sho. 61–61366, published Mar. 29, 1986.
English Abstract of Japanese Patent Publication No. Hei 1–239763, published Sep. 25, 1989.
English Abstract of Japanese Patent Laid–Open Publication No. Sho. 62–234866, published Oct. 15, 1987.

*Primary Examiner*—Bruce F. Bell
*Attorney, Agent, or Firm*—Burns, Doane, Swecker & Mathis, L.L.P.

[57] ABSTRACT

An alkali-zinc secondary battery, employing zinc anode and alkali electrolyte solution comprising barium fluoride, which is much improved in cycle life as well as in efficiency of charge and discharge.

2 Claims, 2 Drawing Sheets

ALKALI-ZINC SECONDARY BATTERY

BACKGROUND OF THE INVENTION

1. Field of the Invention

The present invention relates to an alkali-zinc secondary battery using zinc as an anode and an alkali solution as an electrolyte and, more particularly, to use of barium fluoride to prevent zinc dendrite from growing, thereby improving the capacity and the charging and discharging efficiency.

2. Description of the Prior Art

Alkali-zinc secondary batteries which employ zinc as the active material for cathode are widely used not only as electrical sources for electrical automobile but also as unredeemable secondary batteries for power storage by virtue of their advantages including high energy density and low cost. In the alkali-zinc secondary battery, zinc is dissolved from the anode to the alkali solution upon discharging whereas zinc is deposited from the alkali solution to the anode upon charging. The dissolution and deposition is repeated with the discharging and charging of electrodes. Repetition of such dissolution and deposition alters the shape of the electrode plate. As a result, zinc is not uniformly deposited but grows into needle-like phase. The zinc of needle-like phase penetrates the separator, causing a short circuit. Consequently, the secondary batteries have a significant disadvantage of short life cycle.

To increase the life cycle of the zinc secondary battery, attempts have been made.

Japanese Pat. Laid-Open Publication No. Sho. 60-185372 to Sanyo Co. Ltd., Japan discloses that the oxide or hydrate of In or Tl is added to the zinc electrode with the aim of preventing the densification phenomenon. During charging and discharging, the oxides or hydrates of In or Tl, however, are dissolved into the electrolyte little by little, so this secondary battery is problematic in preventing the densification of the zinc electrode.

Sanyo Co. Ltd. further developed an advanced secondary battery which is disclosed in Japanese Pat. Laid-Open No. Sho. 62-108467 containing the summary that In ions and GeO are added to the electrolyte solution at approximately $10^{-4}$M. The densification on the surface of the zinc electrode cannot satisfactorily be prevented by this technique, neither.

In Japanese Pat. Laid-Open Publication Nos. Sho 60-208053 and Sho 61-61366 and Japanese Pat. Publication No. Hei 1-239763, all applied by Furukawa Co. Ltd., Japan, it is suggested that $TiO_2$, $ZrO_2$, BaO, $Ca(OH)_2$, MgO, or $Ba(OH)_2$ is added to restrain self-discharge and the growth of zinc into needle-like phase. Because these additives are added to the zinc anode, they are also dissolved out the zinc active material prepared by dry compaction, which deleteriously affects the performance of the battery.

SUMMARY OF THE INVENTION

Therefore, it is an object of the present invention to overcome the above problems encountered in prior arts and to provide an alkali-zinc secondary battery which is much improved in cycle life as well as in efficiency of charge and discharge.

Based on the intensive and thorough research by the inventor, the above object could be accomplished by a provision of an alkali-zinc secondary battery using zinc anode and alkali electrolyte solution comprising barium fluoride.

BRIEF DESCRIPTION OF THE DRAWINGS

The above objects and other advantages of the present invention will become more apparent by describing in detail the preferred embodiments of the present invention with reference to the attached drawings in which.

DETAILED DESCRIPTION OF THE INVENTION

During charging, zinc dendrite, an important factor determining the life cycle of alkali-zinc secondary battery, develops into needle-like crystal owing to nonuniform current density on the surface of the zinc electrode. The zinc dendrite of needle-like crystal penetrates the separator, causing a short circuit, which results in reduction of the capacity.

In the present invention, barium fluoride is added to the alkali electrolyte, so as for barium ions to efficiently restrain the growth of zinc dendrite, a needle-like crystal, while preventing a significant decrease of conductivity of the electrolyte. That is, the present invention is characterized by addition of barium fluoride to the electrolyte in an alkali-zinc battery which employs zinc as the anode and an alkali solution as the electrolyte.

The application of the preferred embodiments of the present invention is best understood with reference to the accompanying drawings.

Figure 1:
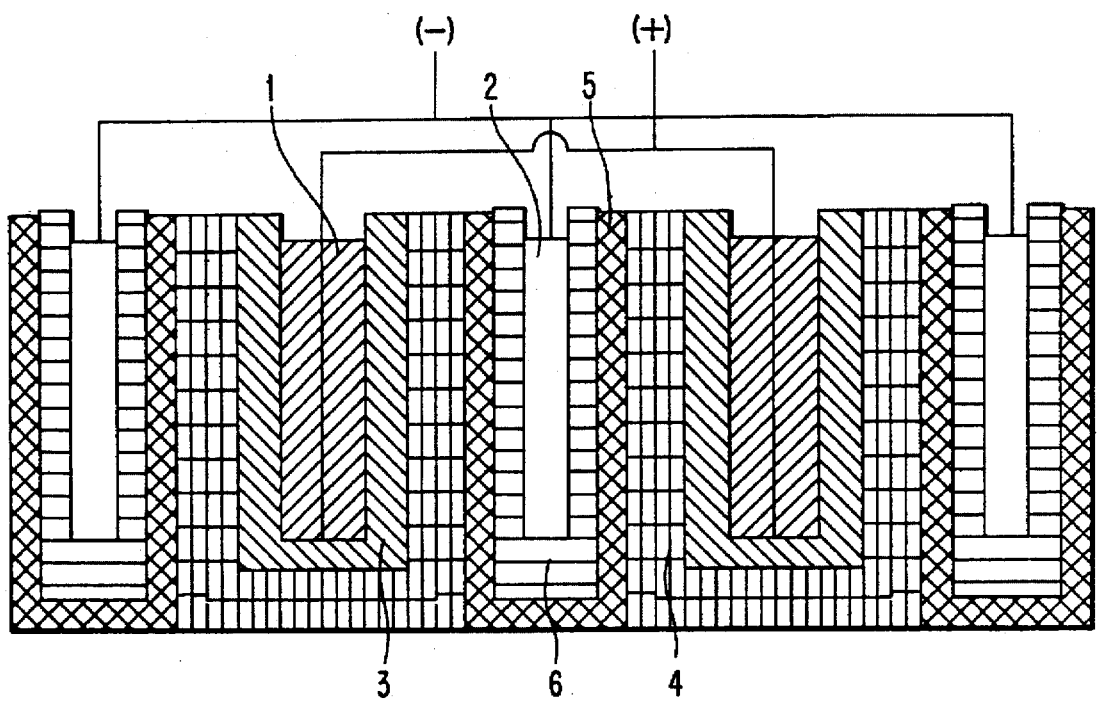
FIG. 1 is a schematic cross section showing an alkali-zinc secondary battery according to the present invention.

Referring to FIG. 1, there is shown a nickel-zinc secondary battery according to an embodiment of the present invention. As shown in FIG. 1, the nickel-zinc secondary battery has a nickel cathode 1 and a zinc anode 2 which are provided with a hydrophilic polyamide nonwoven fabric 3 and a cotton nonwoven fabric 6, respectively. Polyamide nonwoven fabric 3, which is permeable to oxygen gas and capable of containing moisture in amounts of 300%, helps the nickel cathode give full play to its capacity in addition to retaining the electrolyte solution. In turn, polyamide nonwoven fabric 3 is surrounded by a duplex hydrophilic polypropylene microporous membrane 4, in order to prevent the growth of the zinc dendrite. Meanwhile, cotton nonwoven fabric 6 plays an important role in restraining the zinc dendrite from penetrating the separator. In addition, cotton nonwoven fabric 6 removes the oxygen generated from nickel cathode 1 by absorbing it. Like the polyamide nonwoven fabric, it is surrounded by a silver-coated polypropylene film 5, so as to minimize the moisture content in the electrolyte and to facilitate the oxygen adsorption.

The present invention is to add barium fluoride to the alkali electrolyte solution in such battery. Barium fluoride is very helpful to prevent the growth of the zinc dendrite which is produced owing to nonuniform distribution of the zinc anode upon charging or discharging. Particularly, the presence of fluorine ions in the electrolyte solution contributes to an improvement in charging and discharging efficiency.

In more detail, barium fluoride, which is little soluble in alkali solution, is dissolved to before the solubility limit, and added in the electrolyte solution comprising KOH, and LiOH as major components. Because of the strong electrical oxidation property of barium ions, they are oxidized in the electrolyte solution, prior to the zinc dendrite attributable to the nonuniform distribution, so that the growth of the zinc dendrite is prevented. In addition, the superior electrical conductivity and mobility of fluorine ions can compensate for the decrease of electrical conductivity caused by the barium ions.

It is preferred that barium fluoride is added at a concentration of $10^{-4}$ to $10^{-3}$M. For example, because barium fluoride is very difficult to dissolve in alkali solution, when the concentration of barium fluoride exceeds $10^{-3}$M, precipitates are generated from this oversaturated solution, bringing about adverse effects. On the other hand, if barium fluoride is used at a concentration lower than $10^{-4}$M, there is no addition effect.

A better understanding of the present invention may be obtained in light of the following examples which are set forth to illustrate, and are not to be construed to limit, the present invention.

EXAMPLE I

In this example, a sintered nickel electrode was used as the cathode while an electrode prepared by dry compaction process was adopted as the anode.

First, a mixture comprising 80% by weight of zinc oxide, 10% by weight of zinc powder, 5% by weight of a binder consisting of polytetrafluoroethylene (PTFE) resin and ethylene oxide resin, 3% by weight of lead oxide, and 2% by weight of cadmium oxide was well kneaded and formed into an anode active ingredient using a roller.

As the nickel cathode, there was used an electrical collector that was prepared by expanding a nickel plate with a porosity of 75%.

Because the zinc anode which was prepared by dry compaction process was weak in rigidity and showed a high probability that the active ingredient might fall off, a cellulosic nonwoven fabric was provided for the electrode, so as to restrain the reduction of capacity as much as possible.

Using 6M potassium hydroxide solution and 0.6M LiOH solution, the concentration of barium fluoride was adjusted as indicated in Table 1 below.

For this example, two experimental batteries was prepared and the test results are the average values of them. The experimental batteries each employed two nickel electrodes, each consisting of two plates with a size of 6 cm×4 cm and a capacity of 3.4 Ah. Three zinc anodes were used each of which had the same size with the nickel cathode and a capacity of 11.7 Ah. Therefore, the capacity ratio of the cathode to the anode was 3.45:1.

The nickel cathodes each was sealed by nylon nonwoven fabric 100 μm thick which was, then, surrounded by a duplex hydrophilic polypropylene membrane 25 μm thick in order to restrain the penetration of zinc dendrite. Meanwhile, each of the zinc anodes was coated with a single layer of cellulosic nonwoven fabric whose surface was treated with PTFE, in order to minimize the moisture content in the electrolyte solution. A hydrophobic polypropylene membrane was provided for the cellulosic nonwoven fabric, in order to facilitate the permeation of oxygen gas and the adsorption of hydrogen gas, thereby restrain the increase of pressure in the inside of the battery as much as possible.

Charging and discharging test was effected at 90% charge rate and 80% DOD. That is, after the battery was charged in three steps and discharged for three hours, the capacity of the battery was determined when the voltage of the battery reached 1.2 V. And, the cycle of the battery was taken for the calculation until the cycle became 60% of the regular capacity.

For the electrolyte solution, a restriction was effected at 1.4 ml/Zn, Ah. After being added, the electrolyte solution maintained for 24 hours under the atmosphere, to sufficiently age the electrodes. Thereafter, the battery was closed by mounting a transmitter for measuring pressure at an inlet for electrolyte solution. Then, the inside pressure upon charging the battery was measured. This measurement was continued until the inside pressure reached an appropriate value.

EXAMPLE II

Two batteries were prepared in a manner similar to that of Example I, except that the concentration of barium fluoride was used as indicated in Table 1. The charge and discharge properties of the batteries were measured in the same way as that of Example I.

EXAMPLE III

Two batteries were prepared in a manner similar to that of Example I, except that the concentration of barium fluoride was used as indicated in Table 1. The charge and discharge properties of the batteries were measured in the same way as that of Example I.

COMPARATIVE EXAMPLE I

Two batteries were prepared in a manner similar to that of Example I, except that barium fluoride was not used as indicated in Table 1. The charge and discharge properties of the batteries were measured in the same way as that of Example I.

TABLE 1

| Example No. | Conc. of $BaF_2$ (M) |
| --- | --- |
| I | 0.005 |
| II | 0.0001 |
| III | 0.001 |
| C.I | 0.0000 |

Figure 2:
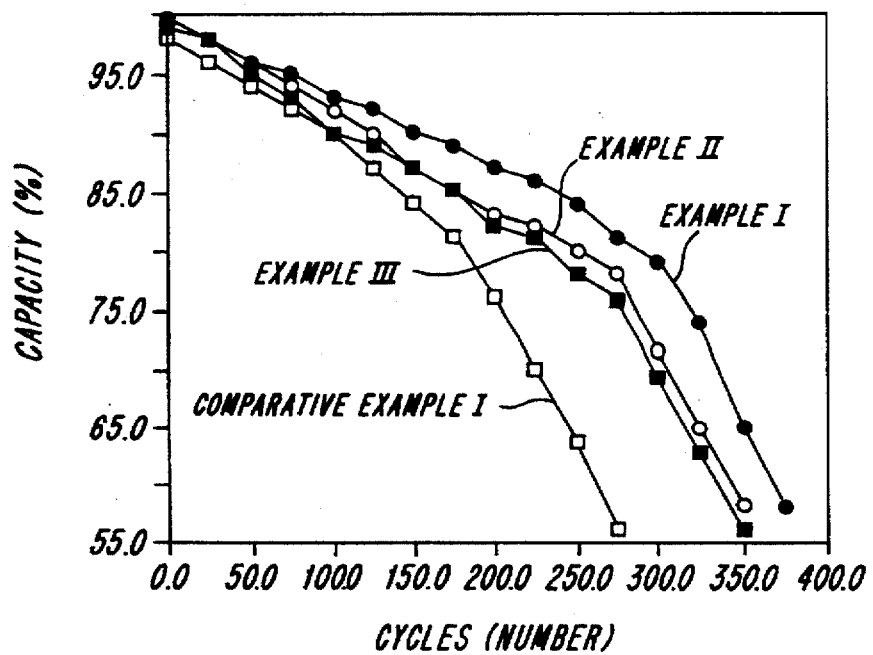
FIG. 2 shows the change of the cycle life of batteries with the amount of $BaF_2$.

Referring to FIG. 2, the capacities of battery varying with the concentration of barium fluoride are plotted with regard to the cycle numbers of charging and discharging. As apparent from the figure, the batteries comprising barium fluoride at a concentration of $10^{-4}$ to $10^{-3}$M according to the present invention are superior to one comprising no barium fluoride in duration time.

Figure 3:
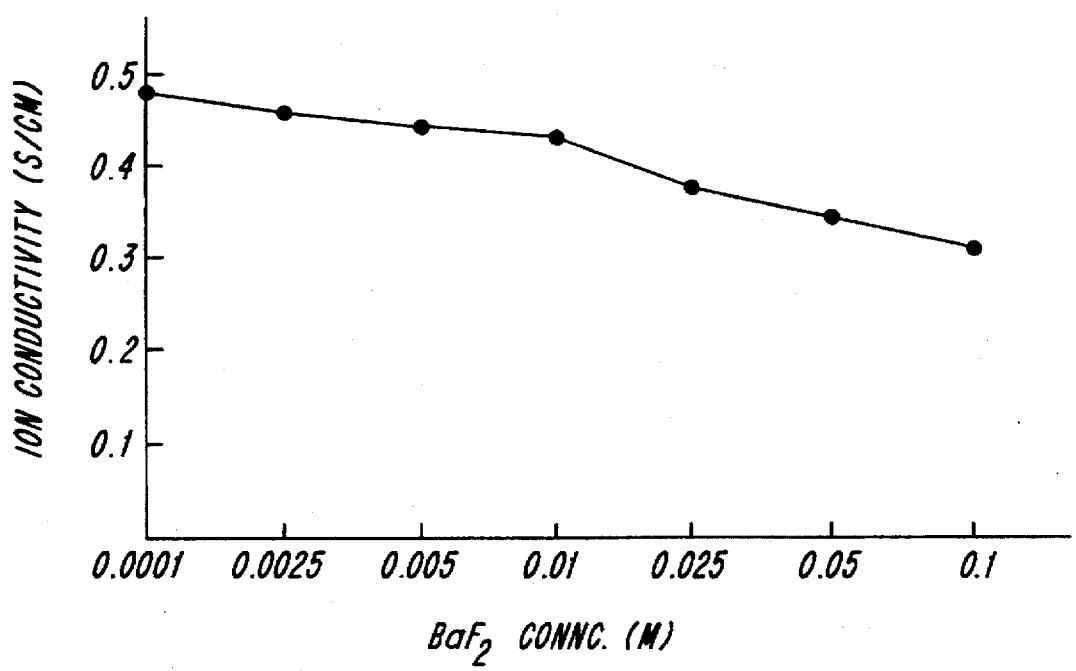
FIG. 3 shows the change of electrical conductivity of electrolyte solution with the amount of $BaF_2$.

With reference to FIG. 3, there is shown the change of ion electrical conductivity with the concentration of barium fluoride. Barium fluoride has a lower ion electrical conductivity than pure KOH but a similar conductivity to other electrolytes.

Figure 4:
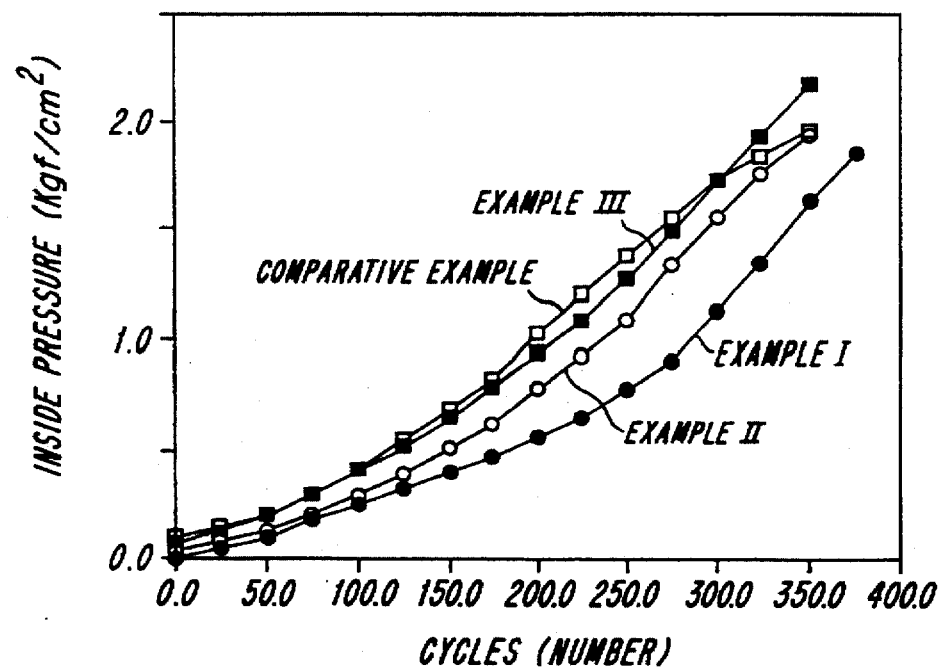
FIG. 4 shows the change of the inside pressure of batteries with charging cycles.

FIG. 4 shows the change of the inside pressure of battery with charge cycles. From this data, it is apparent that the batteries of the present invention comprising barium fluoride at a concentration of $10^{-4}$ to $10^{-3}$M shows lower inside pressures than that of the battery comprising no barium fluoride. This is believed to result from the fact that the oxygen gas generated is efficiently absorbed in the separator. Therefore, the effect of zinc dendrite can be efficiently prevented in the alkali-zinc secondary battery of the present invention and thus, they are remarkably improved in life span. In addition, fluorine ions supplement the electrical conductivity in the electrolyte solution, giving rise to increasing the efficiency of charging and discharging.

Other features, advantages and embodiments of the present invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. An alkali-zinc secondary battery employing zinc anode and alkali electrolyte solution, in which barium fluoride is contained in the electrolyte solution.

2. An alkali-zinc secondary battery in accordance with claim 1, wherein barium fluoride is contained at a concentration of $10^{-4}$ to $10^{-3}$M.

* * * * *